(12) United States Patent
Schawer et al.

(10) Patent No.: US 10,920,660 B2
(45) Date of Patent: Feb. 16, 2021

(54) ADJUSTING DEVICE FOR A TURBOCHARGER, AND TURBOCHARGER

(71) Applicant: IHI Charging Systems International GmbH, Heidelberg (DE)

(72) Inventors: Ralf Schawer, Schwetzingen (DE); Jens Zweydinger, Mannheim (DE)

(73) Assignee: IHI Charging Systems International GmbH, Amt Wachsenburg OT Ichtershausen (DE)

( * ) Notice: Subject to any disclaimer, the term of this patent is extended or adjusted under 35 U.S.C. 154(b) by 164 days.

(21) Appl. No.: 16/064,486

(22) PCT Filed: Jan. 10, 2017

(86) PCT No.: PCT/EP2017/000025
§ 371 (c)(1),
(2) Date: Jun. 21, 2018

(87) PCT Pub. No.: WO2017/125240
PCT Pub. Date: Jul. 27, 2017

(65) Prior Publication Data
US 2019/0003376 A1     Jan. 3, 2019

(30) Foreign Application Priority Data
Jan. 20, 2016   (DE) .................. 10 2016 100 900

(51) Int. Cl.
*F02B 37/18*     (2006.01)
*F16C 17/02*     (2006.01)
(Continued)

(52) U.S. Cl.
CPC ............ *F02B 37/186* (2013.01); *F16C 17/02* (2013.01); *F16C 27/02* (2013.01); *F02C 6/12* (2013.01);
(Continued)

(58) Field of Classification Search
CPC ...... F02B 37/186; F02B 37/183; F02B 37/18; F02B 37/16; F02B 37/162
(Continued)

(56) References Cited

U.S. PATENT DOCUMENTS

2014/0366530 A1* 12/2014 Murayama ............ F02B 37/183
60/602
2015/0125273 A1   5/2015 Tschirschke
2018/0073425 A1   3/2018 Stilgenbauer et al.

FOREIGN PATENT DOCUMENTS

DE      102010043147 A1    10/2011
DE      102011076361 A1    11/2012
(Continued)

*Primary Examiner* — Kenneth Bomberg
*Assistant Examiner* — Jason Mikus
(74) *Attorney, Agent, or Firm* — Smartpat PLC

(57) ABSTRACT

The invention relates to a control device for a turbocharger, comprising an exhaust gas conducting section through which fluid can flow and which includes a bypass duct for bypassing a turbine wheel that is rotatably arranged in the exhaust gas conducting section, and comprising an adjusting arm (3) for accommodating a valve element (2) provided for opening or blocking a flow cross-section of the bypass duct; the adjusting arm (3) is movably accommodated in the exhaust gas conducting section; furthermore, a flexible element (14) is provided at least for securing the valve element (2) in place on the adjusting arm (3). According to the invention, the flexible element (14) is designed so as to be radially slidable in order to reduce adjustment forces.

6 Claims, 2 Drawing Sheets

(51) Int. Cl.
    *F16C 27/02*     (2006.01)
    *F02C 6/12*     (2006.01)

(52) U.S. Cl.
    CPC ...... *F05D 2220/40* (2013.01); *F05D 2240/40* (2013.01); *F16C 2360/24* (2013.01); *Y02T 10/12* (2013.01)

(58) Field of Classification Search
    USPC .......................................... 415/145; 251/85
    See application file for complete search history.

(56) References Cited

FOREIGN PATENT DOCUMENTS

| | | |
|---|---|---|
| DE | 102012101322 A1 | 12/2012 |
| DE | 112013002861 | 2/2015 |
| WO | 2013192029 A1 | 12/2013 |
| WO | 2014011468 A1 | 1/2014 |

* cited by examiner

ADJUSTING DEVICE FOR A TURBOCHARGER, AND TURBOCHARGER

TECHNICAL FIELD

The disclosure relates to an adjusting device for an exhaust turbocharger and to an exhaust turbocharger.

BACKGROUND

DE 10 2012 101 322 A1 discloses an adjusting device for an exhaust turbocharger having a turbine, wherein the turbine comprises an exhaust gas conducting section, through which fluid can flow, and a bypass duct which serves to bypass an exhaust gas flow of a turbine wheel disposed in the exhaust gas conducting section. The adjusting device comprises a valve element for closing the bypass duct, and an adjusting arm which accommodates the valve element. This adjusting arm is rotatably mounted in the exhaust gas conducting section. The valve element is secured in place on the adjusting arm with the aid of a spring element in order to avoid noise during operation of the exhaust turbocharger.

It is problematic that, owing to the operation of the exhaust turbocharger, in particular in connecting the exhaust turbocharger to an internal combustion engine, the exhaust turbocharger is subjected to temperature fluctuations and body vibrations. The temperature fluctuations lead to constant heating and cooling of the individual components of the exhaust turbocharger, wherein the greatest temperature fluctuations are present in particular in the region of the turbine of the exhaust turbocharger owing to the combustion product of the internal combustion engine flowing through the exhaust gas conducting section. Therefore, the closer a component of the exhaust turbocharger is disposed to a duct of the exhaust gas conducting section containing the through-flowing combustion product, the greater the probability of failure of this component because the constantly repeating changes in temperature lead to a constant change in the expansion of the components, whereby loosening, stresses or material fatigue can occur. Since the movable connection is formed with the aid of the securing element exerting compression stress and therefore comprising the adjusting members to be connected, an outer side of the securing element is positioned close to the duct containing the combustion product and is consequently subjected to the temperature fluctuations mentioned above.

The spring element serves to secure the valve element in place in each position. In a closed position, the flow cross-section is to be closed without leakages with the aid of the valve element so that there are no losses in the degree of efficiency of the exhaust turbocharger. When the valve element is in an opened position in which it partially or completely releases the flow cross-section, it is possible, owing to the exhaust gas flow in the bypass duct, for vibrations to be generated in the valve element. These should also be avoided since they can be accompanied by rattling noises.

The object of the present invention is to provide an improved control device for an exhaust turbocharger. The further object is to produce an improved exhaust turbocharger.

SUMMARY

This object is achieved by an adjusting device for an exhaust turbocharger as described and claimed. The further object is achieved by an exhaust turbocharger as described and claimed.

The control device in accordance with the invention for an exhaust turbocharger comprises a valve element accommodated on an adjusting arm of the control device. The valve element is disposed in an exhaust gas conducting section—through which fluid can flow—of the exhaust turbocharger in a bypass duct of the exhaust gas conducting section and serves to open or close a flow cross-section of the bypass duct. The bypass duct makes it possible to bypass a turbine wheel rotatably disposed in the exhaust gas conducting section, which turbine wheel, when the flow cross-section is closed, has flowing through it the entire exhaust gas quantity which flows through the exhaust gas conducting section. The adjusting arm is movably accommodated in the exhaust gas conducting section. In order to secure the valve element in place a spring element is provided on the adjusting arm. In accordance with the invention, the spring element is designed to be able to slide radially in order to reduce adjusting forces.

In a conventional manner, prior art spring elements can move in an axial direction along a valve longitudinal axis. In other words, they can be compressed so that their axial expansion is reduced or they relax so that their axial expansion increases. This takes place in dependence upon the forces acting upon the valve element. A decentralised loading of the valve element leads to a high level of loading of the spring element with high compressive forces and increased adjusting forces which are to be applied by the actuator. This is accompanied by a high level of wear on the spring element which is associated with reduced service life of the control device.

The spring element of the control device in accordance with the invention is able, by reason of its radial sliding capability, within the system consisting of the valve element and adjusting arm, to compensate for tilting movements caused by the decentralised loading and to allow corresponding relative movements of the components without itself being additionally deformed. Thus, only slight additional loading occurs for the actuator and for the spring disc itself. This leads to increased service life for the control device and to the possibility of dimensioning the actuator smaller. Similarly, in particular rattling noises occurring during closure of the bypass duct are avoided.

Furthermore, even during mounting of the valve element on the adjusting arm considerably lower pretensioning forces of the spring element arise than in known systems since it is not compressed or is compressed considerably less than in the known systems.

In one embodiment, the spring element is designed to be able to slide about a tilt point of the valve element. Therefore, the possible tilt point, which is constructionally determined, is already determined and the spring element can be dimensioned in manner adapted to this tilt point. This leads to a further improvement in the control device by a further reduction in the adjusting forces.

In a further embodiment, the spring element is accommodated between a cover disc and the adjusting arm. This leads to be possibility of disposing the spring element between these two components in a corresponding manner and forming one of these two components to be able to slide radially.

The cover disc is preferably designed to support the radially sliding movement of the spring element. The component designed for the radially sliding movement is to be machined in a corresponding manner and, by reason of its ease of handling, the cover disc is more economical to produce than the adjusting arm.

In a further embodiment, the cover disc comprises a groove on its cover surface facing the spring element. This assists engagement and support of the spring element. In particular, provided that the groove has a cross-sectional surface which is at least partially arcuate, a radius adapted according to the tilt point is to be formed in which the spring disc can slide radially.

The second aspect of the invention relates to an exhaust turbocharger which comprises an exhaust gas conducting section, through which fluid can flow, having a bypass duct for bypassing a turbine wheel rotatably disposed in the exhaust gas conducting section, and having a control device for opening and closing a flow cross-section of the bypass duct, wherein the control device is designed according to one of claims 1 to 7. An exhaust turbocharger is therefore provided which in addition to increased service life also comprises quick response behaviour of the control device. This can lead to a reduction in exhaust gas emission of the internal combustion engine to which the exhaust turbocharger is connected.

Further advantages, features and details of the invention will be apparent from the following description of preferred exemplified embodiments and with reference to the drawing. The features and combinations of features mentioned earlier in the description and the features and combinations of features mentioned hereinunder in the description of the figures and/or only illustrated in the figures can be employed not only in the combination stated in each case but also in other combinations or on their own without departing from the scope of the invention.

DETAILED DESCRIPTION

Figure 1:
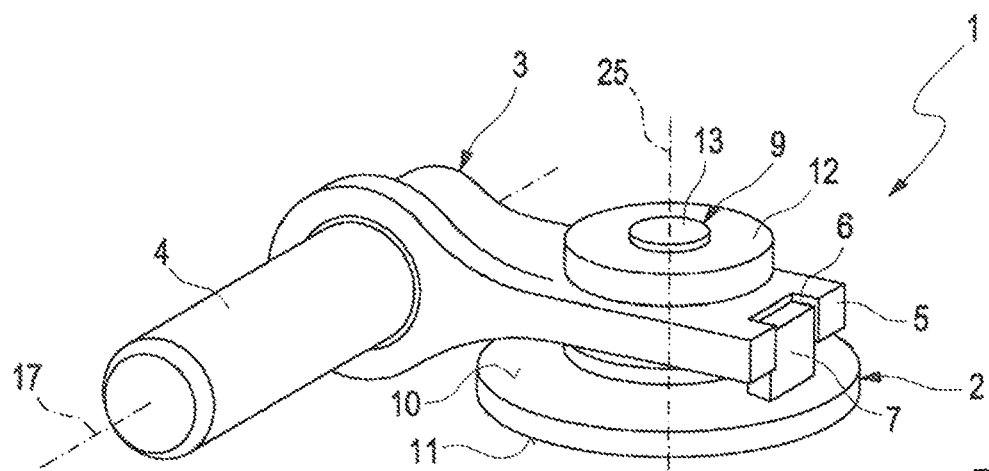
FIG. 1 is a perspective view of a control device of an exhaust turbocharger according to the prior art.
Figure 2:
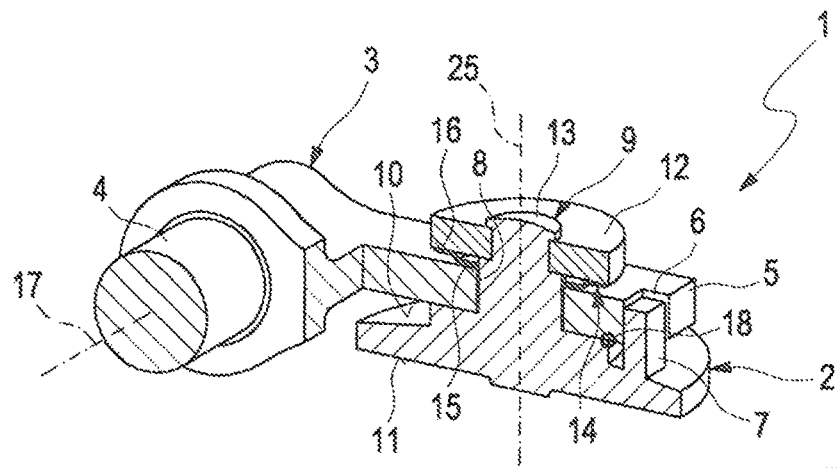
FIG. 2 is a perspective cross-sectional view of the control device of FIG. 1.
Figure 3:
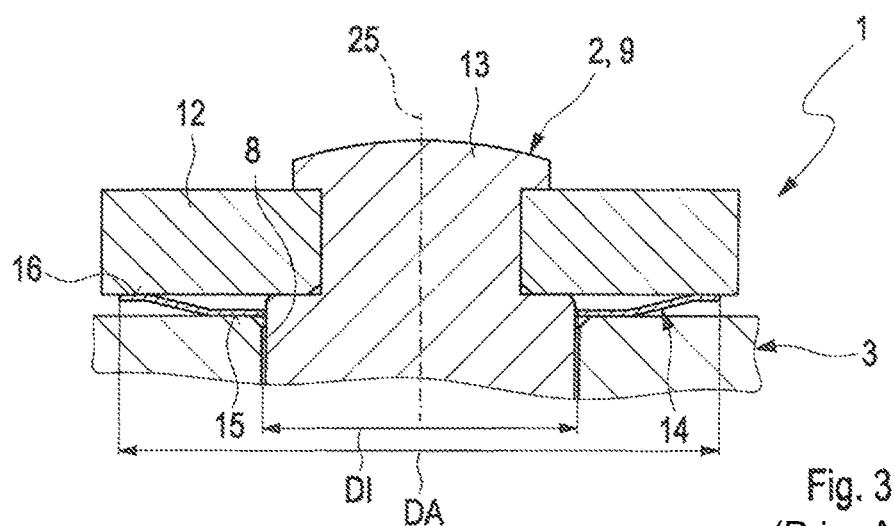
FIG. 3 is a section of a longitudinal cross-section of the control device of FIG. 1.

A control device 1 of an exhaust turbocharger, not illustrated in more detail, according to the prior art is designed as illustrated in FIG. 1. The exhaust turbocharger comprises an exhaust gas conducting section, through which fluid can flow and which is not illustrated in more detail, said exhaust gas conducting section having a fluid, generally exhaust gas, flowing through it during operation of the exhaust turbocharger. The exhaust gas is generally a combustion product of an internal combustion engine, not illustrated in more detail. Such control devices are known as wastegate devices.

The exhaust turbocharger is allocated an air conducting section, through which fluid can flow and which is not illustrated in more detail, and a bearing section which is positioned between the exhaust gas conducting section and the air conducting section and is not illustrated in more detail, wherein a rotor assembly, not illustrated in more detail, is rotatably accommodated in the bearing section. The rotor assembly comprises a compressor wheel, not illustrated in more detail, and a turbine wheel, not illustrated in more detail, these being connected to one another for conjoint rotation by means of a shaft, not illustrated in more detail. The compressor wheel is rotatably accommodated in a first wheel chamber, not illustrated in more detail, of the air conducting section in order to take in generally fresh air, and the turbine wheel is rotatably accommodated in a second wheel chamber, not illustrated in more detail, of the exhaust gas conducting section. When the exhaust turbocharger is in operation, the turbine wheel is subjected to, and driven by, the exhaust gas flowing through the exhaust gas conducting section, wherein a rotational movement can be effected. This rotational movement can be transferred to the compressor wheel with the aid of the shaft, which compressor wheel can therefore effect a rotational movement simultaneously with the rotational movement of the turbine wheel. With the aid of the compressor wheel and the rotational movement thereof, fresh air is taken in and is compressed in the air conducting section.

The exhaust turbocharger is designed as a so-called wastegate charger, i.e. it comprises the control device 1 for complete or partial bypassing of the turbine wheel with the aid of a bypass duct, not illustrated in more detail, formed in the exhaust gas conducting section. This control device 1, which is designed to control a flow cross-section, not illustrated in more detail, of the bypass duct, comprises a valve element 2, designed to be able to close and open said duct, preferably in the form of a flap, generally designated as a wastegate flap or wastegate valve, and an adjusting device, not illustrated in more detail, for actuating this valve element 2.

The valve element 2, comprising a valve element longitudinal axis 25, is disposed on an adjusting arm 3 of the adjusting device. The adjusting arm 3 comprises, on its end 5 remote from an adjusting shaft 4 of the adjusting arm 3, a forked accommodating opening 6 for accommodating a securing pin 7.

The securing pin 7 serves to prevent rotation of the valve element 2 which is accommodated in a further accommodating opening 8 of the adjusting arm 3 with the aid of a pin-shaped or bolt-shaped spigot 9. The spigot 9 and the securing pin 7 are formed on a first valve surface 10 facing the adjusting arm 3. A second valve surface 11 of the valve element 2 remote from the first valve surface 10 is positioned facing the flow cross-section to be controlled.

The valve element 2 is fixed with the aid of a cover disc 12 on the adjusting arm 3. The spigot 9 protrudes through the further accommodating opening 8 and into the cover disc 12. On its spigot end 13 remote from the second valve surface 11 it is connected in a rivet-like manner to the adjusting arm 3 with the aid of the cover disc 12. It can likewise also be welded, or welded and riveted.

A spring element 14 for tensioning the valve element 2 is disposed between the adjusting arm 3 and the cover disc 12, whereby rattling noises during movement of the valve element 2 are reduced. Furthermore, this spring element 14 serves to compensate for play, in particular even play compensation owing to large changes in temperature during operation of the exhaust turbocharger. In this way wear between the adjusting arm 3, the valve element 2 and the cover disc 12 is reduced.

The spring element 14 is designed as a plate spring and comprises an inner diameter DI and an outer diameter DA. In the region of the inner diameter DI a first contact surface 15 is formed which is on a level with the adjusting arm 3. In other words, the first contact surface 15 lies flat against the adjusting arm 3. In the region of the outer diameter DA a second contact surface 16 is formed which is on a level with the cover disc 12. In other words, the second contact surface 16 is supported flat against the cover disc 12.

When the control device 1 is in operation, the valve element 2 rotates or pivots about an axis of rotation 17 of the adjusting shaft 4. A so-called tilt point 18 of the valve element 2 is thus formed, about which it tilts owing to decentralised loading. This leads to additional loading of the spring element 14, from which a high level of setting forces results. These setting forces are to be applied by the actuator, not illustrated in more detail, which effects an adjustment of the valve element 2.

Figure 4:
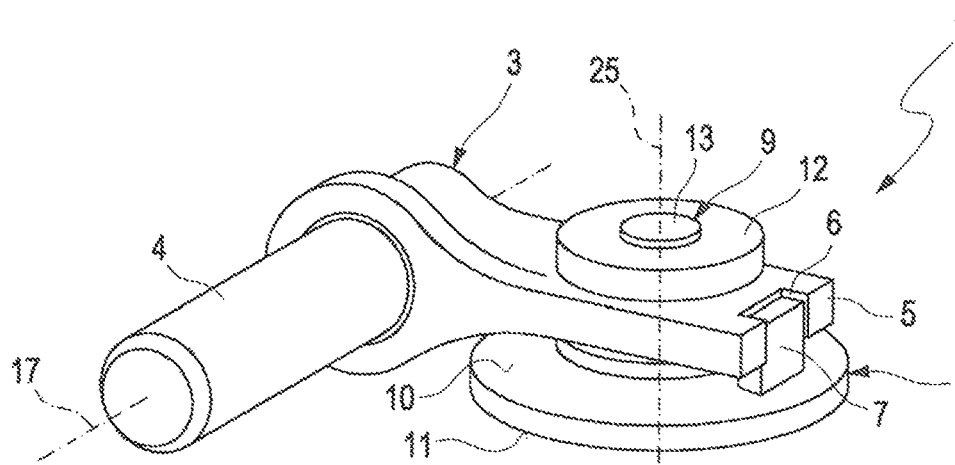
FIG. 4 is a perspective view of a control device in accordance with the invention of an exhaust turbocharger in accordance with the invention.
Figure 5:
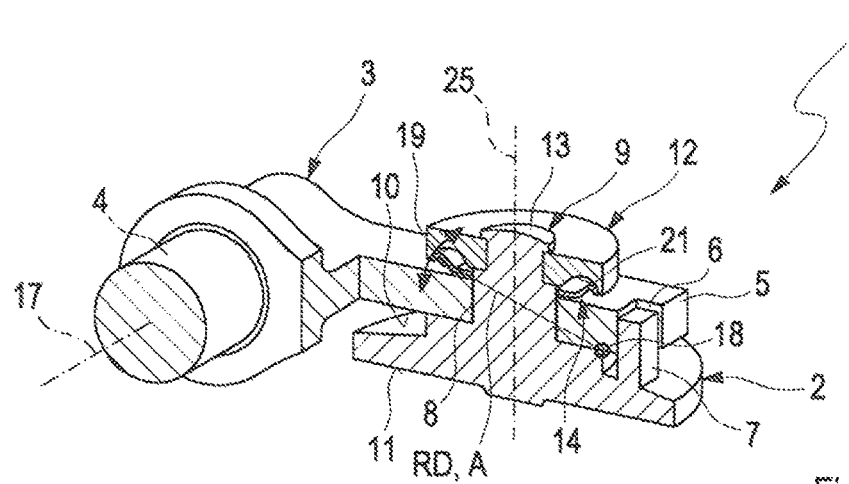
FIG. 5 is a perspective cross-sectional view of the control device of FIG. 4.
Figure 6:
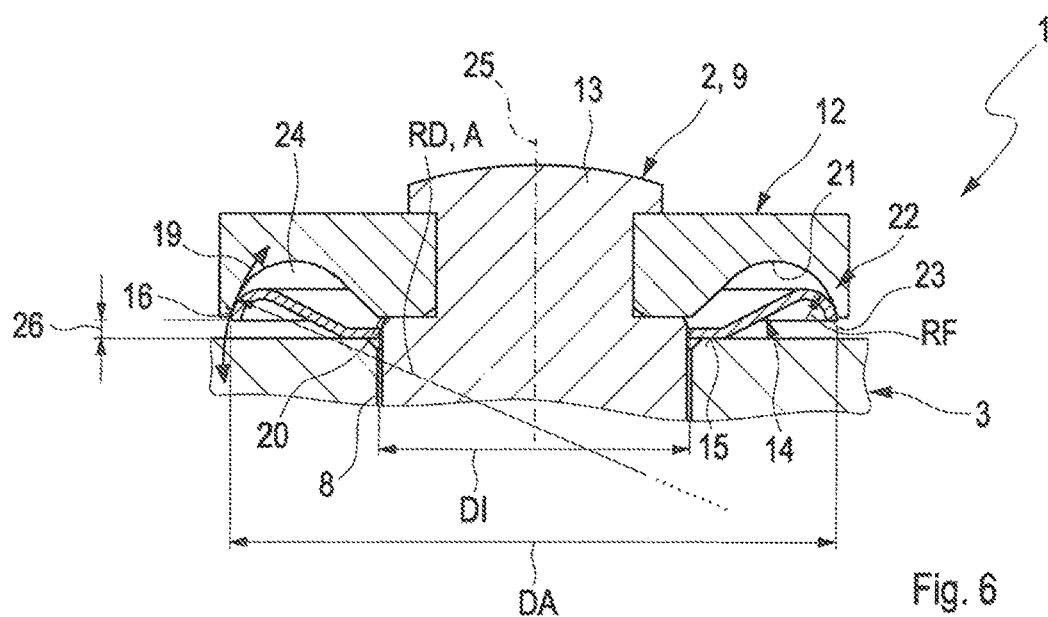
FIG. 6 is a section of a longitudinal cross-section of the control device of FIG. 4.

FIGS. 4 to 6 illustrate a control device 1 in accordance with the invention. The control device 1 in accordance with the invention comprises the spring element 14 which is formed in such a way that the spring element 14 can effect a radially sliding movement along the arrow 19 during operation of the exhaust turbocharger.

The spring element 14 comprises the first contact surface 15 in the region of its inner diameter DI. On its outer diameter DA, the spring element 14 is arcuate, wherein a spring element radius RF is formed on the outer diameter DA. The first contact surface 15, which is on a level with the adjusting arm 3, serves during mounting to centre the spring element 14.

The cover disc 12 comprises a groove 21 on its cover surface 20 facing the spring element 14, which groove has an arcuate cross-sectional surface 24. The cross-sectional surface 24 comprises a cover disc radius RD in a movement region 22 adjoining the cover surface 20, which cover disc radius corresponds to a space A between the tilt point 18 and an outer edge 23 of the spring element 14.

With the aid of the spring element radius RF the second contact surface 16 is formed in a quasi-linear manner since the outer edge 23 does not lie against the adjusting arm 3 and a further space 26 is formed between the outer edge 23 and the adjusting arm 3.

During operation of the control device 1 the spring element 14 can carry out a rotation about the tilt point 18, whereby the spring element 14 is relieved. In other words, this means that the spring element 14 can slide in the groove 21 about the tilt point 18 of the valve element 2 with the aid of its arcuate outer edge 23. The cover disc 12 is designed to support the radially sliding movement of the spring element 14.

The invention claimed is:

1. A control device for an exhaust turbocharger, the exhaust turbocharger having an exhaust gas conducting section, through which fluid can flow and which comprises a bypass duct for bypassing a turbine wheel rotatably disposed in the exhaust gas conducting section, the control device comprising:
   a valve element which is provided for opening or closing a flow cross-section of the bypass duct,
   an adjusting arm accommodating the valve element, wherein the adjusting arm is movably accommodated in the exhaust gas conducting section,
   a spring element at least for securing the valve element in place on the adjusting arm, and
   a cover disc, wherein the spring element is accommodated between the cover disc and the adjusting arm, and wherein the spring element can slide radially in order to reduce adjusting forces, and wherein the cover disc comprises a groove on its cover surface facing the spring element, and wherein the groove has an arcuate cross-sectional surface having a groove radius, and wherein an outer portion of the spring element is downwardly bent having a bent radius which matches the groove radius.

2. The control device as claimed in claim 1, wherein the spring element can slide about a tilt point of the valve element.

3. The control device as claimed in claim 1, wherein the cover disc is designed to support the radially sliding movement of the spring element.

4. The control device as claimed in claim 1, wherein a second contact surface of the spring element, which has a smaller diameter than an outer edge of the spring element, has contact with the adjusting arm and wherein, between the outer edge and the adjusting arm a further space is formed.

5. An exhaust turbocharger, comprising the turbine wheel and the control device as in claim 1.

6. The control device as in claim 1, wherein the groove is inwardly and outwardly delimited in the cover disc.

* * * * *